United States Patent
Hirosawa (10) Patent No.: US 9,459,507 B2
(45) Date of Patent: *Oct. 4, 2016

(54) LIQUID CRYSTAL DISPLAY DEVICE

(71) Applicant: JAPAN DISPLAY INC., Minato-ku (JP)

(72) Inventor: Jin Hirosawa, Saitama (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,733

(22) Filed: Jun. 2, 2015

(65) Prior Publication Data

US 2015/0261055 A1    Sep. 17, 2015

Related U.S. Application Data

(63) Continuation of application No. 13/897,757, filed on May 20, 2013, now Pat. No. 9,075,278.

(30) Foreign Application Priority Data

May 22, 2012   (JP) ................. 2012-116449

(51) Int. Cl.
*G02F 1/1343* (2006.01)
*G02F 1/1362* (2006.01)
(Continued)

(52) U.S. Cl.
CPC ....... *G02F 1/136286* (2013.01); *G02F 1/1337* (2013.01); *G02F 1/1368* (2013.01);
(Continued)

(58) Field of Classification Search
CPC ................. G02F 1/136286; G02F 1/133345; G02F 1/1337

USPC ...................................... 349/39, 43
See application file for complete search history.

(56) References Cited

U.S. PATENT DOCUMENTS 6,091,473 A    7/2000  Hebiguchi
6,266,116 B1   7/2001  Ohta et al.
(Continued)

FOREIGN PATENT DOCUMENTS

JP    6-222397    8/1994
JP    7-159807    6/1995
(Continued)

OTHER PUBLICATIONS

Office Action issued Oct. 13, 2015 in Japanese Patent Application No. 2012-116449 (with English language translation).
(Continued)

*Primary Examiner* — Lucy Chien
(74) *Attorney, Agent, or Firm* — Oblon, McClelland, Maier & Neustadt, L.L.P.

(57) ABSTRACT

According to one embodiment, a liquid crystal display device includes a first substrate including a first wiring line, a second wiring line located on a first interlayer insulation film, a pixel electrode located on the first interlayer insulation film and including a main pixel electrode and a first sub-pixel electrode, a first common electrode located on a second interlayer insulation film and including a first main common electrode opposed to the second wiring line and a first sub-common electrode opposed to the first wiring line and the first sub-pixel electrode, a second substrate including a second common electrode, and a liquid crystal layer held between the first substrate and the second substrate.

10 Claims, 8 Drawing Sheets

(51) Int. Cl.
  *G02F 1/1368* (2006.01)
  *G02F 1/1333* (2006.01)
  *G02F 1/1337* (2006.01)

(52) U.S. Cl.
  CPC ..... *G02F1/13439* (2013.01); *G02F 1/133345* (2013.01); *G02F 1/134309* (2013.01); *G02F 1/134363* (2013.01); *G02F 1/136213* (2013.01); *G02F 2001/134345* (2013.01); *G02F 2001/134381* (2013.01)

(56) References Cited

U.S. PATENT DOCUMENTS

| | | | |
|---|---|---|---|
| 6,341,003 | B1 | 1/2002 | Ashizawa et al. |
| 6,341,004 | B1 | 1/2002 | Kondo et al. |
| 8,873,008 | B2 | 10/2014 | Yamamoto |
| 2001/0010575 | A1 | 8/2001 | Yoshida et al. |
| 2002/0012077 | A1 | 1/2002 | Fukami et al. |
| 2002/0171779 | A1 | 11/2002 | Kimura et al. |
| 2004/0165136 | A1 | 8/2004 | Sugiyama et al. |
| 2004/0189922 | A1 | 9/2004 | Ono et al. |
| 2005/0206824 | A1 | 9/2005 | Son et al. |
| 2005/0219453 | A1 | 10/2005 | Kubo et al. |
| 2007/0115234 | A1 | 5/2007 | Kim et al. |
| 2008/0062358 | A1 | 3/2008 | Lee et al. |
| 2008/0180590 | A1 | 7/2008 | Lee et al. |
| 2008/0180623 | A1 | 7/2008 | Lee et al. |
| 2008/0186439 | A1 | 8/2008 | Kwon et al. |
| 2013/0321727 | A1 | 12/2013 | Morita et al. |
| 2013/0329156 | A1 | 12/2013 | Hirosawa |
| 2014/0118651 | A1 | 5/2014 | Hirosawa |
| 2015/0055045 | A1 | 2/2015 | Yamamoto |
| 2015/0070620 | A1 | 3/2015 | Hirosawa |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2000-89240 A | 3/2000 |
| JP | 2001-194685 A | 7/2001 |
| JP | 2002-116712 A | 4/2002 |
| JP | 2003-140188 A | 5/2003 |
| JP | 2003-149675 A | 5/2003 |
| JP | 2004-163622 A | 6/2004 |
| JP | 2005-3802 | 1/2005 |
| JP | 3644653 | 2/2005 |
| JP | 2005-242307 | 9/2005 |
| JP | 2009-109657 A | 5/2009 |
| JP | 2009-128905 A | 6/2009 |
| JP | 2009-192822 | 8/2009 |
| JP | 2010-91904 | 4/2010 |
| JP | 2011-209454 | 10/2011 |

OTHER PUBLICATIONS

Office Action issued on Mar. 1, 2016 in Japanese Patent Application No. 2012-116449 with English translation.

LIQUID CRYSTAL DISPLAY DEVICE

CROSS-REFERENCE TO RELATED APPLICATIONS

This application is a continuation of U.S. application Ser. No. 13/897,757 filed May 20, 2013, and is based upon and claims the benefit of priority from Japanese Patent Application No. 2012-116449, filed May 22, 2012, the entire contents of each of which are incorporated herein by reference.

FIELD

Embodiments described herein relate generally to a liquid crystal display device.

BACKGROUND

In recent years, in active matrix liquid crystal devices in which switching elements are incorporated in respective pixels, configurations, which make use of a lateral electric field (including a fringe electric field), such as an IPS (In-Plane Switching) mode or an FFS (Fringe Field Switching) mode, have been put to practical use. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate. In connection with the lateral electric field mode, there has been proposed a technique wherein a lateral electric field or an oblique electric field is produced between a pixel electrode formed on an array substrate and a counter-electrode formed on a counter-substrate, thereby switching liquid crystal molecules.

On the other hand, there has been proposed a device structure wherein a large capacitance is produced by using a pixel electrode and a storage capacitance electrode, and flicker or crosstalk does not easily occur.

DETAILED DESCRIPTION

In general, according to one embodiment, a liquid crystal display device includes: a first substrate including a first wiring line extending in a first direction, a first interlayer insulation film covering the first wiring line, a second wiring line located on the first interlayer insulation film and extending in a second direction crossing the first direction, a switching element electrically connected to the first wiring line and the second wiring line, a pixel electrode which is located on the first interlayer insulation film, is spaced apart from the second wiring line, is electrically connected to the switching element and includes a main pixel electrode extending in the second direction and a first sub-pixel electrode extending in the first direction, a second interlayer insulation film covering the second wiring line and the pixel electrode, a first common electrode which is located on the second interlayer insulation film and includes a first main common electrode extending in the second direction and opposed to the second wiring line, and a first sub-common electrode extending in the first direction and opposed to the first wiring line and the first sub-pixel electrode, and a first alignment film covering the first common electrode; a second substrate including a second common electrode which has the same potential as the first common electrode and includes a second main common electrode extending in the second direction and opposed to the first main common electrode, and a second sub-common electrode extending in the first direction and opposed to the first sub-common electrode, and a second alignment film covering the second common electrode; and a liquid crystal layer held between the first substrate and the second substrate.

According to another embodiment, a liquid crystal display device includes: a first substrate including an insulative substrate, a semiconductor layer located above the insulative substrate, a first insulation film covering the semiconductor layer, a gate line located on the first insulation film and extending in the first direction above the semiconductor layer, a storage capacitance line located on the first insulation film, spaced apart from the gate line and having a part opposed to the semiconductor layer, a second insulation film covering the gate line and the storage capacitance line, a source line which is located on the second insulation film, extends in a second direction crossing the first direction and is electrically connected to the semiconductor layer, a pixel electrode which is located on the second insulation film, is spaced apart from the source line, is electrically connected to the semiconductor layer and includes a main pixel electrode extending in the second direction, a first sub-pixel electrode extending in the first direction and a second sub-pixel electrode extending in the first direction and opposed to the storage capacitance line, a third insulation film covering the source line and the pixel electrode, a first common electrode which is located on the third insulation film and includes a first main common electrode extending in the second direction and opposed to the source line, and a first sub-common electrode extending in the first direction and opposed to the gate line and the first sub-pixel electrode, and a first alignment film covering the first common electrode; a second substrate including a second common electrode which has the same potential as the first common electrode and includes a second main common electrode extending in the second direction and opposed to the first main common electrode, and a second sub-common electrode extending in the first direction and opposed to the first sub-common electrode, and a second alignment film covering the second common electrode; and a liquid crystal layer held between the first substrate and the second substrate.

According to another embodiment, a liquid crystal display device includes: a first substrate including a first wiring line extending in a first direction, a first interlayer insulation film covering the first wiring line, a second wiring line located on the first interlayer insulation film and extending in a second direction crossing the first direction, a switching element electrically connected to the first wiring line and the second wiring line, a pixel electrode which is located on the first interlayer insulation film, is spaced apart from the second wiring line, is electrically connected to the switching element and includes a main pixel electrode extending in the second direction and a first sub-pixel electrode extending in the first direction, a second interlayer insulation film covering the second wiring line and the pixel electrode, a first common electrode which is located on the second interlayer insulation film and includes a first sub-common electrode extending in the first direction and opposed to the first wiring line and the first sub-pixel electrode, and a first alignment film covering the first common electrode; a second substrate including a second common electrode which has the same potential as the first common electrode and includes a second main common electrode extending in the second direction, and a second alignment film covering the second common electrode; and a liquid crystal layer held between the first substrate and the second substrate.

Embodiments will now be described in detail with reference to the accompanying drawings. In the drawings, structural elements having the same or similar functions are denoted by like reference numerals, and an overlapping description is omitted.

Figure 1:
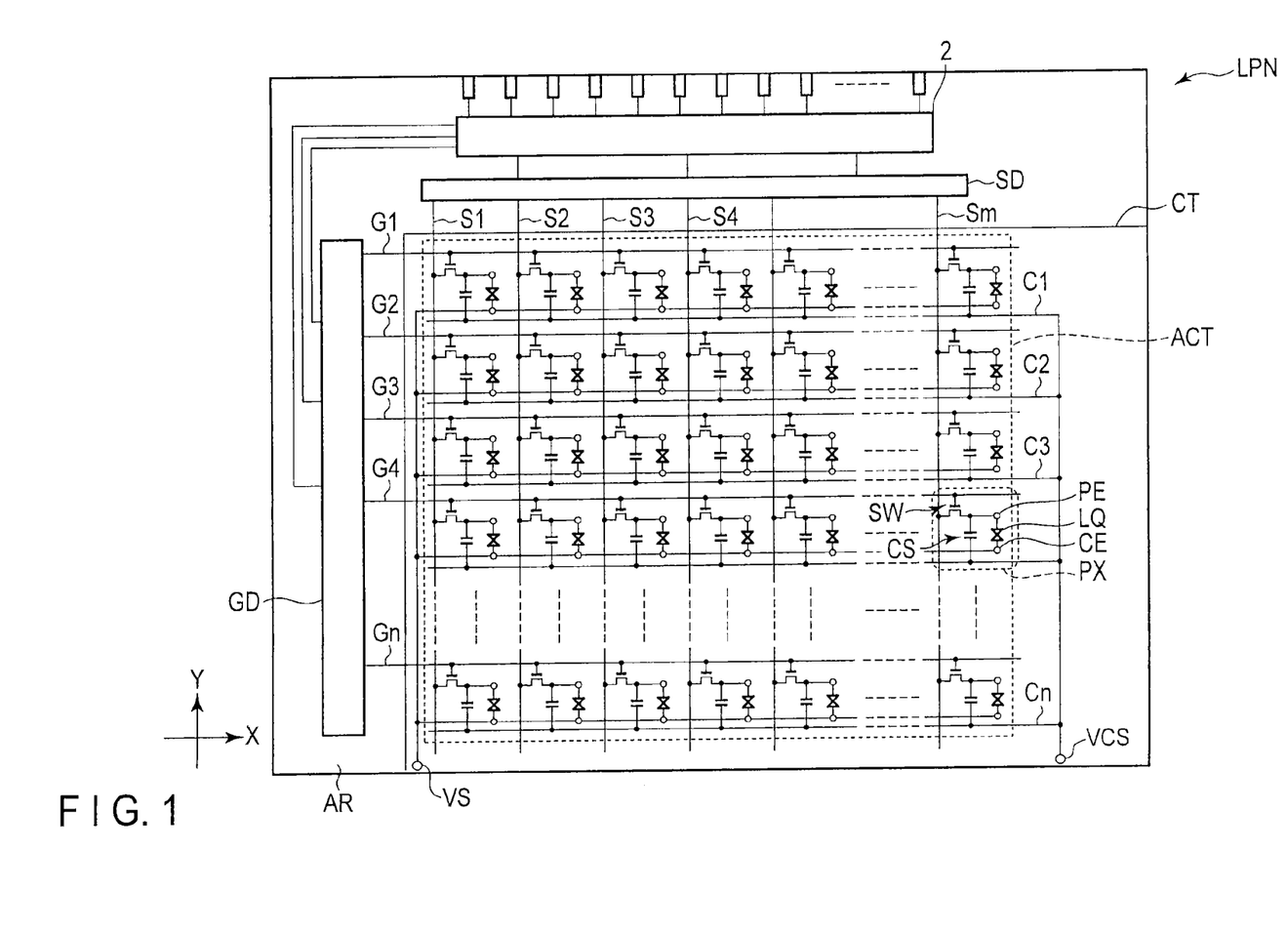
FIG. 1 is a view which schematically illustrates a structure and an equivalent circuit of a liquid crystal display device according to an embodiment.

FIG. 1 is a view which schematically shows a structure and an equivalent circuit of a liquid crystal display device according to an embodiment.

The liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, gate lines G (G1 to Gn), storage capacitance lines C (C1 to Cn), and source lines S (S1 to Sm). The gate lines G correspond to signal lines which extend, for example, substantially linearly in a first direction X. The source lines S cross the gate lines G. The source lines S correspond to signal lines which extend substantially linearly in a second direction Y. In this example, the first direction X and the second direction Y are substantially perpendicular to each other.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR. The gate driver GD and source driver SD are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane (or a substrate major surface) which is defined by the first direction X and second direction Y (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ.

The pixel electrodes PE are formed of an opaque material, like the source lines S. For example, the pixel electrodes PE are formed of a metallic material such as aluminum (Al), titanium (Ti), silver (Ag), molybdenum (Mo), tungsten (W), copper (Cu) or Chromium (Cr), or an alloy including any one of these metallic materials. The common electrode CE may be formed of the same material as the pixel electrode PE, but it may be formed of other electrically conductive material, for example, a transparent, electrically conductive material such as indium tin oxide (ITO) or indium zinc oxide (IZO).

The array substrate AR includes a power supply module VS for applying a voltage to the common electrode CE. The power supply module VS is formed, for example, on the outside of the active area ACT. The common electrode CE of the counter-substrate CT is led out to the outside of the active area ACT, and is electrically connected to the power supply module VS via an electrically conductive member (not shown).

Next, a structure example of one pixel disposed in the active area will be described.

Figure 2:
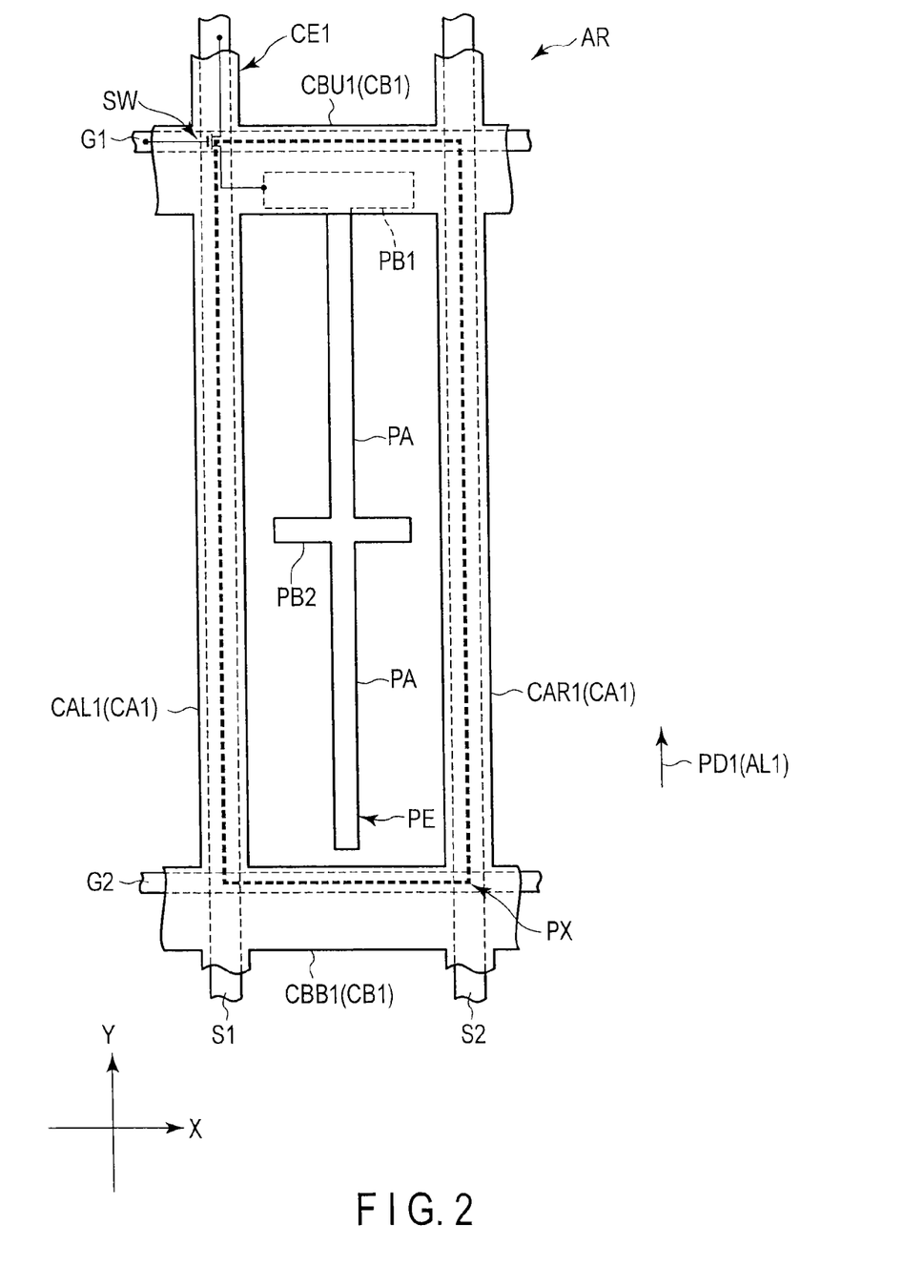
FIG. 2 is a plan view which schematically shows a structure example of one pixel at a time when an array substrate shown in FIG. 1 is viewed from a counter-substrate side.

FIG. 2 is a plan view which schematically shows a structure example of one pixel PX at a time when the array substrate AR shown in FIG. 1 is viewed from the counter-substrate side. FIG. 2 is a plan view in an X-Y plane.

The array substrate AR includes a gate line G1, a gate line G2, a source line S1, a source line S2, a switching element SW, a pixel electrode PE, and a first alignment film AL1. In the first structure example illustrated, the array substrate AR further includes a first common electrode CE1 which is a part of the common electrode CE. The first common electrode CE1 functions also as a storage capacitance line. Thus, the array substrate AR of the first structure example does not include a storage capacitance line as a separate part.

In the example illustrated, as indicated by a broken line, the pixel PX has a rectangular shape having a less length in the first direction X than in the second direction Y. The gate line G1 and gate line G2 are disposed with a distance in the second direction Y, and extend in the first direction X. The source line S1 and source line S2 are disposed with a distance in the first direction X, and extend in the second direction Y. The length of the pixel PX in the first direction X corresponds to the pitch between the source line S1 and source line S2 in the first direction X. The length of the pixel PX in the second direction Y corresponds to the pitch between the gate line G1 and gate line G2 in the second direction Y. The pixel electrode PE is disposed between the neighboring source line S1 and source line S2. In addition, the pixel electrode PE is disposed between the gate line G1 and gate line G2.

In the pixel PX illustrated, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side.

The switching element SW, in the illustrated example, is electrically connected to the gate line G1 and source line S1. The switching element SW is provided at an intersection between the gate line G1 and source line S1. The switching element SW includes a gate electrode which is electrically connected to the gate line G1 (or formed integral with the gate line G1), a source electrode which is electrically connected to the source line S1 (or formed integral with the source line S1), and a drain electrode which is electrically connected to the pixel electrode PE (or formed integral with the pixel electrode PE).

The pixel electrode PE includes a main pixel electrode PA, a first sub-pixel electrode PB1 and a second sub-pixel electrode PB2. The main pixel electrode PA, first sub-pixel electrode PB1 and second sub-pixel electrode PB2 are formed integral or continuous, and are electrically connected to each other. The main pixel electrode PA is located between the source line S1 and source line S2, and linearly extends in the second direction Y to the vicinity of the upper side end portion of the pixel PX and to the vicinity of the lower side end portion of the pixel PX. In the example illustrated, one main pixel electrode PA is located at a substantially middle point between the source line S1 and source line S2. The distance in the first direction X between the source line S1 and main pixel electrode PA is substantially equal to the distance in the first direction X between the source line S2 and main pixel electrode PA. The main pixel electrode PA is formed in a strip shape having a substantially uniform width in the first direction X. Incidentally, the pixel electrode PE may include a plurality of main pixel electrodes PA.

The first sub-pixel electrode PB1 is located near the upper side end portion of the pixel PX, that is, near the gate line G1. In the meantime, there may be a case in which a part of the first sub-pixel electrode PB1 is opposed to the gate line G1. The first sub-pixel electrode PB1 linearly extends in the first direction X. In the example illustrated, the first sub-pixel electrode PB1 is continuous with one end portion of the main pixel electrode PA. The first sub-pixel electrode PB1 is electrically connected to the switching element SW. The first sub-pixel electrode PB1 is formed in a strip shape having a substantially uniform width in the second direction Y.

The second sub-pixel electrode PB2 is spaced apart from the first sub-pixel electrode PB1, and is located at a substantially central part of the pixel PX. The second sub-pixel electrode PB2 linearly extends in the first direction X. In the example illustrated, the second sub-pixel electrode PB2 crosses a substantially middle portion in the second direction Y of the main pixel electrode PA. In other words, each of the first sub-pixel electrode PB1 and second sub-pixel electrode PB2 extends from the main pixel electrode PA toward both the source line S1 and source line S2. The second sub-pixel electrode PB2 is formed in a strip shape having a substantially uniform width in the second direction Y. The width of the second sub-pixel electrode PB2 is equal to the width of the first sub-pixel electrode PB1. Incidentally, the shape of the pixel electrode PE is not limited to the example illustrated. Although the second sub-pixel electrode PB2 is provided in order to form a greater number of domains in one pixel, as will be described later, the second sub-pixel electrode PB2 may be omitted in the present embodiment.

The first common electrode CE1 includes a first main common electrode CA1 and a first sub-common electrode CB1. The first main common electrode CA1 and first sub-common electrode CB1 are formed integral or continuous, and are electrically connected to each other.

The first main common electrode CA1, in the X-Y plane, is located on both sides of the main pixel electrode PA, and linearly extends in the second direction Y. The first main common electrode CA1 is formed at a position opposed to the source line S. The first main common electrode CA1 is formed in a strip shape having a substantially uniform width in the first direction X. In the meantime, in the structure in which the pixel electrode PE includes a plurality of main pixel electrodes PA, the first main common electrode CA1 is located between neighboring main pixel electrodes PA. In the example illustrated, the first main common electrode CA1 includes two first main common electrodes arranged in parallel with a distance in the first direction X, namely a first main common electrode CAL1 disposed at the left side end portion of the pixel PX, and a first main common electrode CAR1 disposed at the right side end portion of the pixel PX. Strictly speaking, the first main common electrode CAL1 is disposed to extend over a boundary between the pixel PX and a pixel neighboring on the left side, and the first main common electrode CAR1 is disposed to extend over a boundary between the pixel PX and a pixel neighboring on the right side. The first main common electrode CAL is opposed to the source line S1, and the first main common electrode CAR is opposed to the source line S2. In the meantime, although the first main common electrode CA1 is provided, for example, in order to shield an undesirable electric field from the source line S, the first main common electrode CA1 may be omitted in the present embodiment.

The first sub-common electrode CB1, in the X-Y plane, linearly extends in the first direction X. The first sub-common electrode CB1 is formed at a position opposed to the gate line G and first sub-pixel electrode PB1. The first sub-common electrode CB1 is formed in a strip shape.

Incidentally, the width of the first sub-common electrode CB1 in the second direction Y may not necessarily be uniform. In the example illustrated, the first sub-common electrode CB1 includes two first sub-common electrodes arranged in parallel with a distance in the second direction Y, namely a first sub-common electrode CBU1 disposed at the upper side end portion of the pixel PX, and a first sub-common electrode CBB1 disposed at the lower side end portion of the pixel PX. Strictly speaking, the first sub-common electrode CBU1 is disposed to extend over a boundary between the pixel PX and a pixel neighboring on the upper side, and the first sub-common electrode CBB1 is disposed to extend over a boundary between the pixel PX and a pixel neighboring on the lower side. Specifically, in the example illustrated, the first common electrode CE1 is formed of the first main common electrode CA1 and first sub-common electrode CB1 in a grid shape which partitions the pixel PX. The first sub-common electrode CBU1 is opposed to the gate line G1 and the first sub-pixel electrode PB1 of the pixel PX. The first sub-common electrode CBB1 is opposed to the gate line G2 and a first sub-pixel electrode (not shown) of a pixel neighboring the pixel PX on the lower side.

Paying attention to the positional relationship between the pixel electrode PE and the first common electrode CE1, the following can be said. In the X-Y plane, the main pixel electrode PA and first main common electrode CA1 are substantially parallel, and are alternately arranged in the first direction X. Specifically, one main pixel electrode PA is located between the first main common electrode CAL1 and first main common electrode CAR1 which neighbor with a distance in the first direction X. Alternatively, there may be a case in which one first main common electrode CA1 is located between two main pixel electrodes PA which neighbor with a distance in the first direction X. The distance in the first direction X between the main pixel electrode PA and first main common electrode CA1 is substantially uniform. For example, the distance in the first direction X between the first main common electrode CAL1 and main pixel electrode PA is equal to the distance in the first direction X between the first main common electrode CAR1 and main pixel electrode PA. The distance in the first direction X between the main pixel electrode PA and first main common electrode CA1 is greater than the thickness of the liquid crystal layer LQ, and is double or more the thickness of the liquid crystal layer LQ.

In the array substrate AR, the first common electrode CE1 is covered with the first alignment film AL1. The first alignment film AL1 is subjected to alignment treatment in a first alignment treatment direction PD1 for initially aligning the liquid crystal molecules of the liquid crystal layer LQ. The first alignment treatment direction PD1, in which the first alignment film AL1 initially aligns the liquid crystal molecules, is substantially parallel to the second direction Y.

Figure 3:
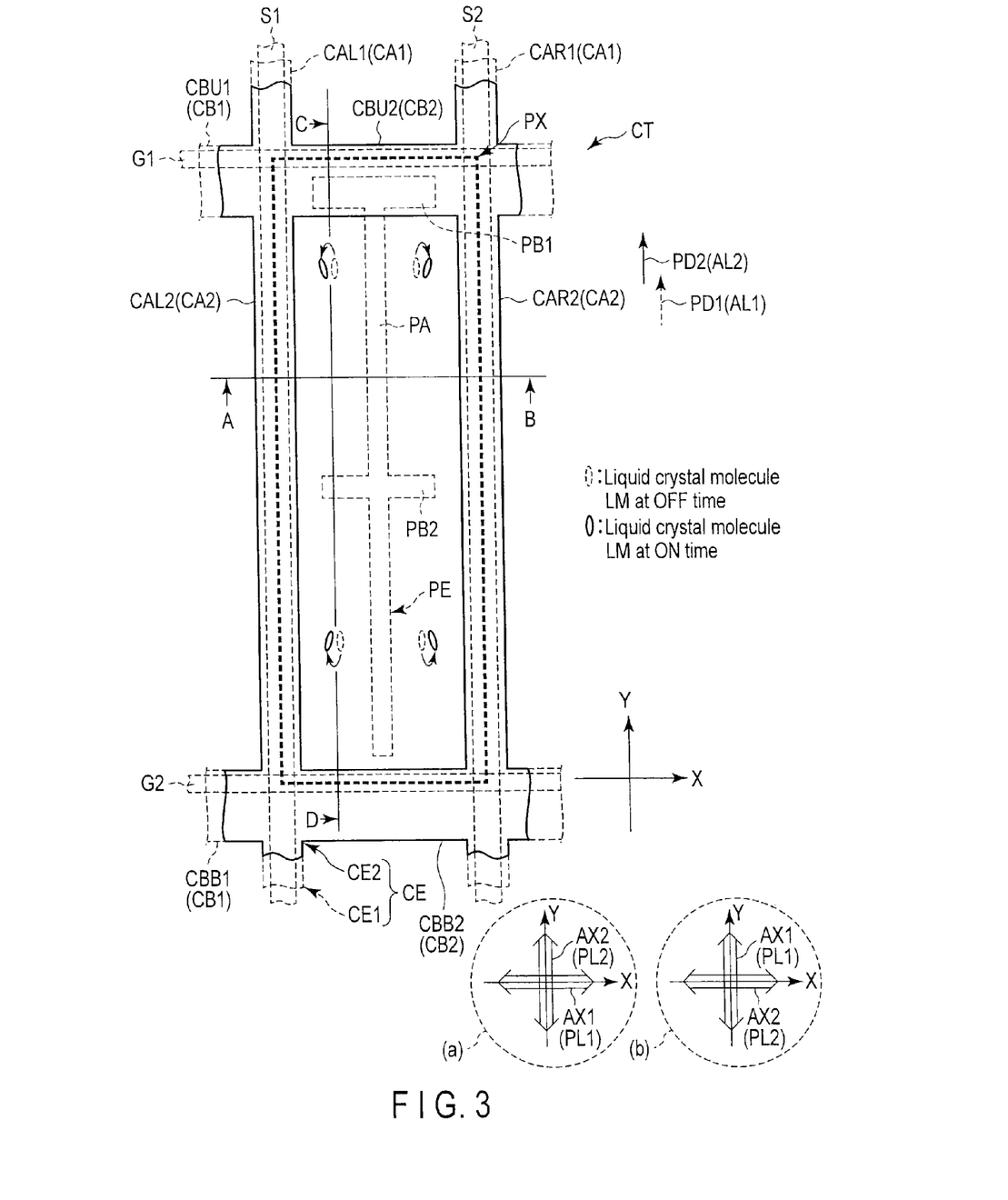
FIG. 3 is a plan view which schematically shows a structure example of one pixel in a counter-substrate shown in FIG. 1.

FIG. 3 is a plan view which schematically shows a structure example of one pixel PX in the counter-substrate CT shown in FIG. 1. FIG. 3 shows a plan view in the X-Y plane. FIG. 3 shows only structural parts that are necessary for the description, and the pixel electrode PE, first common electrode CE1, source lines S and gate lines G, which are main parts of the array substrate, are indicated by broken lines.

The counter-substrate CT includes a second common electrode CE2 which is a part of the common electrode CE. The second common electrode CE2 includes a second main common electrode CA2 and a second sub-common electrode CB2. The second main common electrode CA2 and second sub-common electrode CB2 are formed integral or continuous, and are electrically connected to each other. In addition, the second main common electrode CA2 and second sub-common electrode CB2 are electrically connected to the first common electrode CE1 which is provided on the array substrate, for example, on the outside of the active area, and have the same potential as the first common electrode CE1.

The second main common electrode CA2, in the X-Y plane, is located on both sides of the main pixel electrode PA, and linearly extends in the second direction Y. The second main common electrode CA2 is formed at a position opposed to the first main common electrode CA1. The second main common electrode CA2 is formed in a strip shape having a substantially uniform width in the first direction X. In the example illustrated, the second main common electrode CA2 includes two second main common electrodes arranged in parallel with a distance in the first direction X, namely a second main common electrode CAL2 disposed at the left side end portion of the pixel PX, and a second main common electrode CAR2 disposed at the right side end portion of the pixel PX. Strictly speaking, the second main common electrode CAL2 is disposed to extend over a boundary between the pixel PX and a pixel neighboring on the left side, and the second main common electrode CAR2 is disposed to extend over a boundary between the pixel PX and a pixel neighboring on the right side. The second main common electrode CAL2 is opposed to the first main common electrode CAL1, and is located above the source line S1. The second main common electrode CAR2 is opposed to the first main common electrode CAR1, and is located above the source line S2.

The second sub-common electrode CB2, in the X-Y plane, linearly extends in the first direction X. The second sub-common electrode CB2 is formed at a position opposed to the first sub-common electrode CB1. The second sub-common electrode CB2 is formed in a strip shape having a substantially uniform width in the second direction Y. In the example illustrated, the second sub-common electrode CB2 includes two second sub-common electrodes arranged in parallel with a distance in the second direction Y, namely a second sub-common electrode CBU2 disposed at the upper side end portion of the pixel PX, and a second sub-common electrode CBB2 disposed at the lower side end portion of the pixel PX. Strictly speaking, the second sub-common electrode CBU2 is disposed to extend over a boundary between the pixel PX and a pixel neighboring on the upper side, and the second sub-common electrode CBB2 is disposed to extend over a boundary between the pixel PX and a pixel neighboring on the lower side. Specifically, in the counter-substrate CT, the second common electrode CE2 is formed of the second main common electrode CA2 and second sub-common electrode CB2 in a grid shape which partitions the pixel PX. The second sub-common electrode CBU2 is opposed to the first sub-common electrode CBU1, and is located above the gate line G1 and the first sub-pixel electrode PB1 of the pixel PX. The second sub-common electrode CBB2 is opposed to the first sub-common electrode CBB1, and is located above the gate line G2 and a first sub-pixel electrode (not shown) of a pixel neighboring the pixel PX on the lower side. In the meantime, the second sub-common electrode CB2 may be omitted.

Paying attention to the positional relationship between the pixel electrode PE and the second common electrode CE2, the following can be said. In the X-Y plane, the main pixel electrode PA and second main common electrode CA2 are substantially parallel, and are alternately arranged in the first direction X. Specifically, one main pixel electrode PA is located between the second main common electrode CAL2 and second main common electrode CAR2 which neighbor with a distance in the first direction X. Alternatively, there may be a case in which one second main common electrode CA2 is located between main pixel electrodes PA which neighbor with a distance in the first direction X.

In the counter-substrate CT, the second common electrode CE2 is covered with the second alignment film AL2. The second alignment film AL2 is subjected to alignment treatment in a second alignment treatment direction PD2 for initially aligning the liquid crystal molecules of the liquid crystal layer LQ. The second alignment treatment direction PD2, in which the second alignment film AL2 initially aligns the liquid crystal molecules, is substantially parallel to the first alignment treatment direction PD1. In the example illustrated, the second alignment treatment direction PD2 and the first alignment treatment direction PD1 are identical. In the meantime, the first alignment treatment direction PD1 and the second alignment treatment direction PD2 may be opposite to each other, or may be identical in a direction reverse to the direction in the illustrated example, that is, in a direction from the gate line G1 toward the gate line G2.

Figure 4:
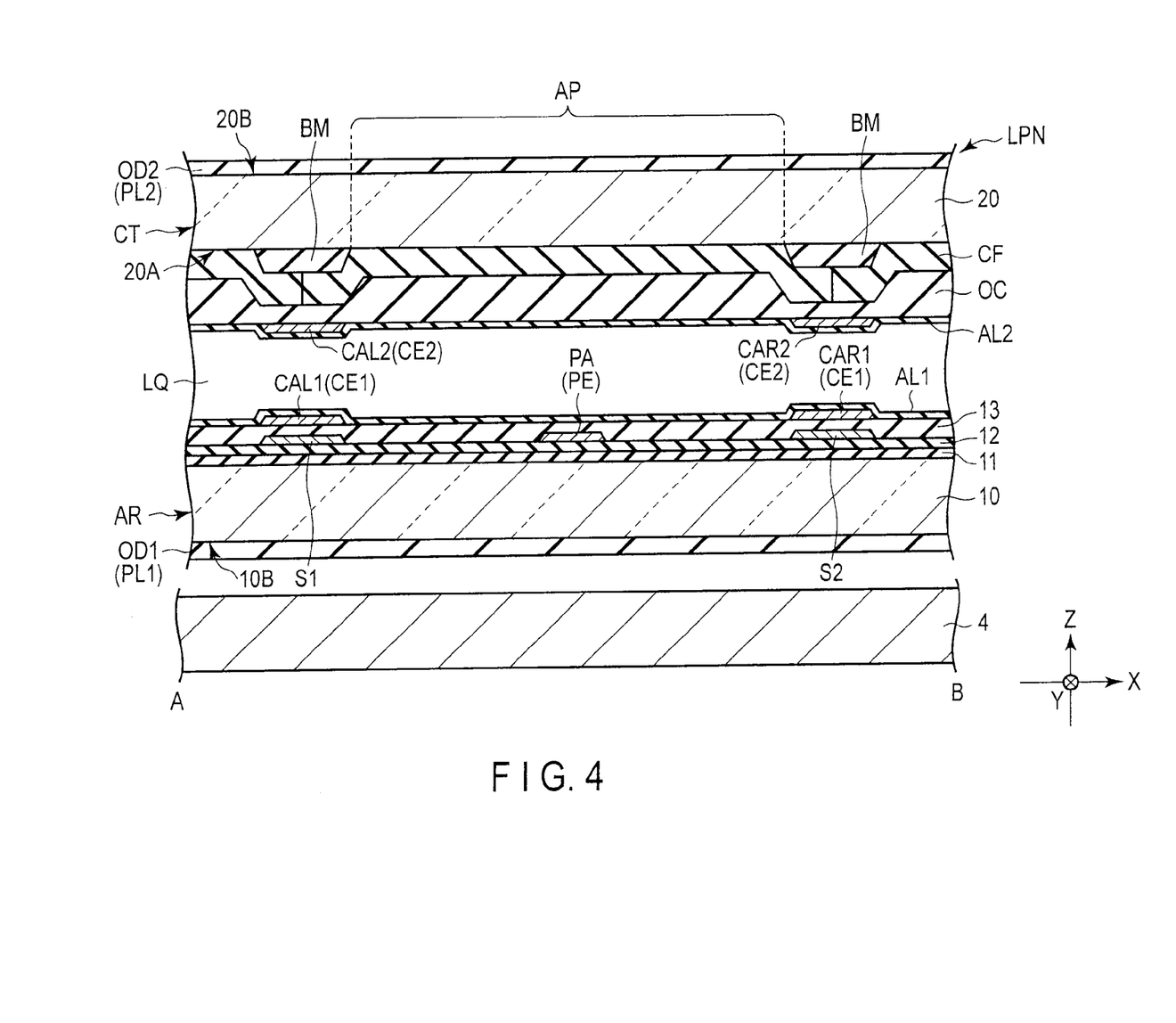
FIG. 4 is a schematic cross-sectional view, taken along line A-B in FIG. 3, showing a cross-sectional structure of a liquid crystal display panel shown in FIG. 3.
Figure 5:
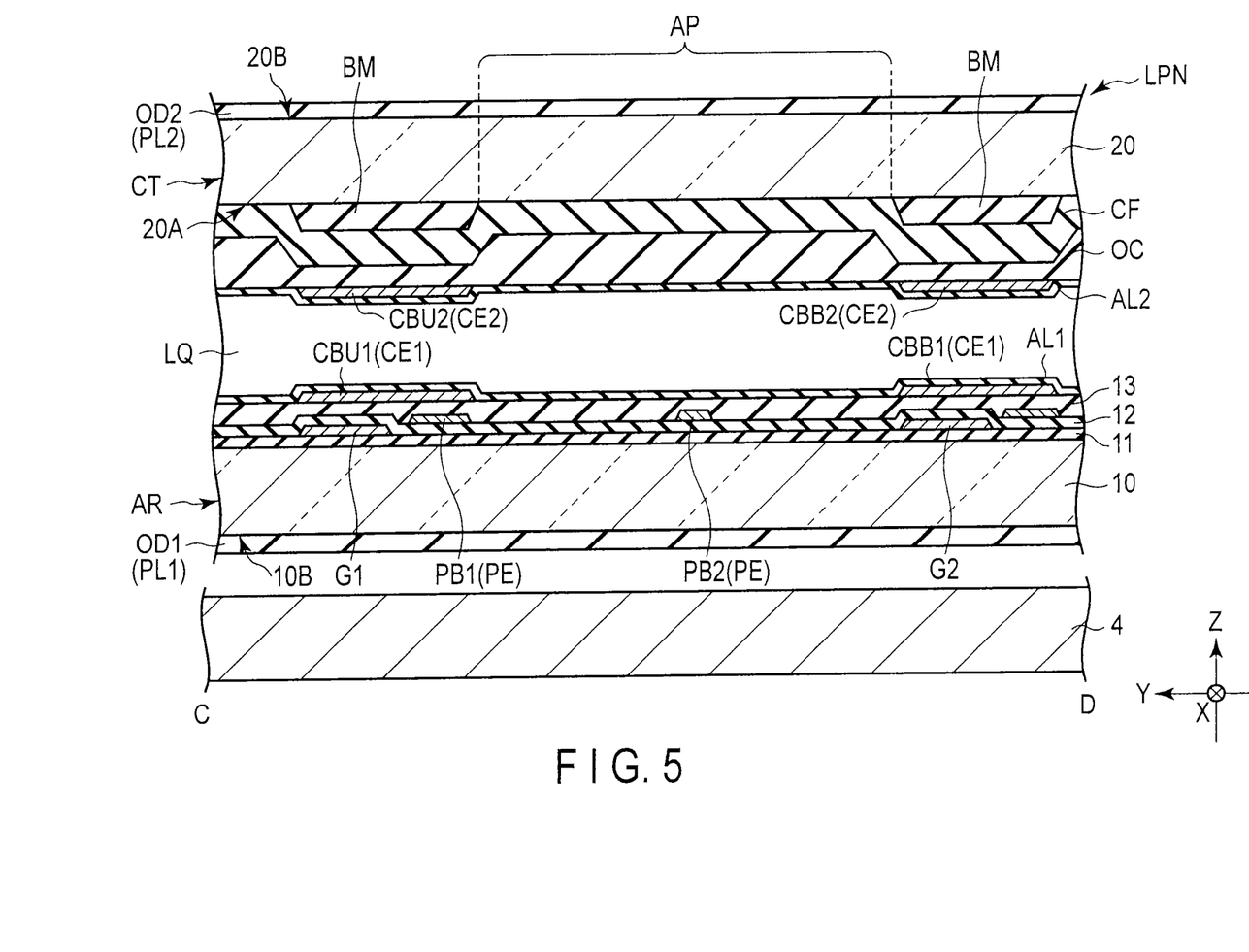
FIG. 5 is a schematic cross-sectional view, taken along line C-D in FIG. 3, showing a cross-sectional structure of the liquid crystal display panel shown in FIG. 3.

FIG. 4 is a schematic cross-sectional view, taken along line A-B in FIG. 3, showing a cross-sectional structure of the liquid crystal display panel LPN shown in FIG. 3, as viewed from the gate line G2 side. FIG. 5 is a schematic cross-sectional view, taken along line C-D in FIG. 3, showing a cross-sectional structure of the liquid crystal display panel LPN shown in FIG. 3, as viewed from the source line S1 side. FIG. 4 and FIG. 5 show only parts which are necessary for the description.

A backlight 4 is disposed on the back side of the array substrate AR which constitutes the liquid crystal display panel LPN. Various modes are applicable to the backlight 4. A description of the detailed structure of the backlight 4 is omitted.

The array substrate AR is formed by using a first insulative substrate 10 having light transmissivity. The array substrate AR includes, on the inside of the first insulative substrate 10, that is, on the side facing the counter-substrate CT, a gate line G1, a gate line G2, a source line S1, a source line S2, a pixel electrode PE, a first common electrode CE1, a first insulation film 11, a second insulation film (first interlayer insulation film) 12, a third insulation film (second interlayer insulation film) 13, and a first alignment film AL1.

The gate line G1 and gate line G2 are formed on the first insulation film 11, and are covered with the second insulation film 12. The source line S1, source line S2 and pixel electrode PE (main pixel electrode PA, first sub-pixel electrode PB1 and second sub-pixel electrode PB2) are formed on the second insulation film 12 and are covered with the third insulation film 13. Specifically, the source lines S and pixel electrode PE are formed in the same layer and can be formed of the same material. The main pixel electrode PA is located between the neighboring source line S1 and source line S2. The first sub-pixel electrode PB1 and second sub-pixel electrode PB2 are located between the neighboring gate line G1 and gate line G2.

The third insulation film 13 is formed of a transparent resin material. The third insulation film 13 reduces stepped portions between the source line S1, source line S2 and pixel electrode PE, on the one hand, and the second insulation film 12, on the other hand, and the surface of the third insulation film 13 is planarized. The thickness of the third insulation film 13 is, e.g. 1 μm or less.

The first common electrode CE1 (first main common electrode CAL1, first main common electrode CAR1, first sub-common electrode CBU1 and first sub-common electrode CBB1) is formed on the third insulation film 13. The first main common electrode CAL1 is located above the source line S1, the first main common electrode CAR1 is located above the source line S2, the first sub-common electrode CBU1 is located above the gate line G1 and first sub-pixel electrode PB1, and the first sub-common electrode CBB1 is located above the gate line G2. In the example illustrated, a capacitance, which is necessary for driving the pixel, is produced between the first sub-pixel electrode PB1 and first sub-common electrode CBU1 which are opposed to each other via the third insulation film 13. In the meantime, the transparent first insulation film 11 and second insulation film 12 are interposed between the main pixel electrode PA and first insulative substrate 10, and in the example illustrated, no other wiring or an electrode for producing a capacitance between itself and the main pixel electrode PA is interposed.

The first alignment film AL1 is disposed on that surface of the array substrate AR, which is opposed to the counter-substrate CT, and the first alignment film AL1 extends over substantially the entirety of the active area ACT. The first alignment film AL1 covers the first common electrode CE1, and is also disposed on the third insulation film 13. The first alignment film AL1 is formed of a material which exhibits horizontal alignment properties.

The counter-substrate CT is formed by using a second insulative substrate 20 having light transmissivity. The counter-substrate CT includes a black matrix BM, a color filter CF, an overcoat layer OC, second common electrode CE2 and second alignment film AL2, on the inside of the second insulative substrate 20, that is, on that side of the second insulative substrate 20, which is opposed to the array substrate AR.

The black matrix BM partitions each pixel PX and forms an aperture portion AP. The black matrix BM is disposed so as to be opposed to wiring portions, such as the source lines S, gate lines G and switching elements SW. In the example illustrated, the black matrix BM includes portions which are located above the source line S1 and source line S2 and extend in the second direction Y, and portions which are located above the gate line G1 and gate line G2 and extend in the first direction X, and the black matrix BM is formed in a grid shape. The black matrix BM is disposed on an inner surface 20A of the second insulative substrate 20, which is opposed to the array substrate AR.

The color filter CF is disposed in association with each pixel PX. The color filter CF is disposed on an inside partitioned by the black matrix BM on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surface of the color filters CF. The overcoat layer OC is formed of, for example, a transparent resin material.

The second common electrode CE2 (second main common electrode CAL2, second main common electrode CAR2, second sub-common electrode CBU2 and second sub-common electrode CBB2) is formed on that side of the overcoat layer OC, which is opposed to the array substrate AR, and is located below the black matrix BM. The first main common electrode CAL1 is located below the second main common electrode CAL2. The first main common electrode CAR1 is located below the second main common electrode CAR2. The first sub-common electrode CBU1 is located below the second sub-common electrode CBU2. The first sub-common electrode CBB1 is located below the second sub-common electrode CBB2. In the above-described aperture portion AP, regions between the pixel electrode PE and the first common electrode CE1 and second common electrode CE2 correspond to transmissive regions through which backlight can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the second common electrode CE2 and the overcoat layer OC. The second alignment film AL2 is formed of a material which exhibits horizontal alignment properties.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 µm, is created. The array substrate AR and counter-substrate CT are attached by a sealant on the outside of the active area ACT in the state in which the predetermined cell gap is created therebetween. The liquid crystal layer LQ is held in the cell gap which is created between the array substrate AR and the counter-substrate CT, and is disposed between the first alignment film AL1 and second alignment film AL2. The liquid crystal layer LQ is composed of, for example, a liquid crystal material having a positive (positive-type) dielectric constant anisotropy.

A first optical element OD1 is attached to an outer surface of the array substrate AR, that is, an outer surface 10B of the first insulative substrate 10. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1. In the meantime, another optical element, such as a retardation plate, may be disposed between the first polarizer PL1 and the first insulative substrate 10.

A second optical element OD2 is attached to an outer surface of the counter-substrate CT, that is, an outer surface 20B of the second insulative substrate 20. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a substantially orthogonal positional relationship (crossed Nicols). In this case, one of the polarizers is disposed, for example, such that the polarization axis thereof is substantially parallel or substantially perpendicular to the direction of extension of the main pixel electrode PA or the initial alignment direction of liquid crystal molecules. Specifically, when the direction of extension of the main pixel electrode PA or the initial alignment direction of liquid crystal molecules is the second direction Y, the absorption axis of one of the polarizers is substantially parallel to the second direction Y or substantially perpendicular to the second direction Y. In an example shown in part (a) of FIG. 3, the first polarizer PL1 is disposed such that the first polarization axis AX1 thereof is parallel to the first direction X, and the second polarizer PL2 is disposed such that the second polarization axis AX2 thereof is parallel to the second direction Y. In an example shown in part (b) of FIG. 3, the second polarizer PL2 is disposed such that the second polarization axis AX2 thereof is parallel to the first direction X, and the first polarizer PL1 is disposed such that the first polarization axis AX1 thereof is parallel to the second direction Y.

Next, the operation of the liquid crystal display panel LPN having the above-described structure is described.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

In the meantime, the initial alignment direction of the liquid crystal molecule LM corresponds to a direction in which the major axis of the liquid crystal molecule LM at the OFF time is orthogonally projected onto the X-Y plane. In this example, the first alignment treatment direction PD1 and the second alignment treatment direction PD2 are substantially parallel to the second direction Y and are identical. The liquid crystal molecule LM at the OFF time is initially aligned such that the major axis thereof is substantially parallel to the second direction Y, as indicated by a broken line in FIG. 3. In short, the initial alignment direction of the liquid crystal molecule LM is parallel to the second direction Y.

In the cross section of the liquid crystal layer LQ, the liquid crystal molecules LM are substantially horizontally aligned (the pre-tilt angle is substantially zero) in the middle part of the liquid crystal layer LQ, and the liquid crystal molecules LM are aligned with such pre-tilt angles that the liquid crystal molecules LM become symmetric in the vicinity of the array substrate AR (i.e. in the vicinity of first alignment film AL1) and in the vicinity of the counter-substrate CT (i.e. in the vicinity of second alignment film AL2), with respect to the middle part as the boundary (splay alignment). In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

At this OFF time, part of light from the backlight 4 passes through the first polarizer PL1, and enters the liquid crystal display panel LPN. The light, which has entered the liquid crystal display panel LPN, is linearly polarized light which is perpendicular to the first polarization axis AX1 of the first polarizer PL1. The polarization state of linearly polarized light hardly varies when the light passes through the liquid crystal layer LQ at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which an electric field is produced between the pixel electrode PE and the common electrode CE (first common electrode CE1 and second common electrode CE2), a lateral electric field (or an oblique electric field), which is substantially parallel to the substrates, is produced between the pixel electrode PE and the common electrode CE. The liquid crystal molecules LM are affected by the electric field between the pixel electrode PE and common electrode CE, and the polarization state thereof varies. In the example shown in FIG. 3, in the region between the pixel electrode PE and second main common electrode CRL2, the liquid crystal molecule LM in a lower-half region rotates clockwise relative to the second direction Y, and is aligned in a lower left direction in the Figure, and the liquid crystal molecule LM in an upper-half region rotates counterclockwise relative to the second direction Y, and is aligned in an upper left direction in the Figure. In the region between the pixel electrode PE and second main common electrode CAR2, the liquid crystal molecule LM in a lower-half region rotates counterclockwise relative to the second direction Y, and is aligned in a lower right direction in the Figure, and the liquid crystal molecule LM in an upper-half region rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrodes PE, and domains are formed in the respective alignment directions. Specifically, a plurality of domains are formed in one pixel PX.

At this ON time, the polarization state of linearly polarized light, which has entered the liquid crystal display panel LPN, varies depending on the alignment state of the liquid crystal molecules LM when the light passes through the liquid crystal layer LQ. Thus, at the ON time, at least part of the light emerging from the liquid crystal layer LQ passes through the second polarizer PL2 (white display). However, at a position overlapping the pixel electrode or common electrode, since the liquid crystal molecules maintain the initial alignment state, black display is effected as in the case of the OFF time.

According to the present embodiment, the pixel electrode PE includes the first sub-pixel electrode PB1 which is electrically connected to the switching element SW, and a capacitance, which is necessary for driving the pixel, is produced between the first sub-pixel electrode PB1 and first sub-common electrode CBU1 which are opposed to each other via the third insulation film 13. Thus, there is no need to additionally provide a storage capacitance line on the array substrate AR, or to increase the width of a part of the pixel electrode PE. Therefore, according to the present embodiment, compared to the case in which a storage capacitance line which crosses the pixel PX is provided, the area of the transmissive region can be increased and the transmittance can be enhanced. For example, in a comparative example in which a storage capacitance line which crosses the pixel PX is provided in a manner to overlap the second sub-pixel electrode PB2, the region between the second sub-pixel electrode PB2 and source line S is shielded by the storage capacitance line, and the width in the second direction Y of the storage capacitance line and second sub-pixel electrode PB2 needs to be increased in order to produce a sufficient capacitance. Hence, in the comparative example, a considerable area of the transmission region is lost. On the other hand, according to the present embodiment, since the storage capacitance line is not provided and the width of a part of the pixel electrode PE is not increased, the loss of the transmissive region is small. In addition, in the case where the second sub-pixel electrode PB2 is provided in order to form a greater number of domains, it should suffice if the width of the second sub-pixel electrode PB2 is such a width that a voltage necessary for driving liquid crystal molecules is applied, and the second sub-pixel electrode PB2 does not need to have such a width as to produce a capacitance. Thus, the transmissive region can be made larger than in the comparative example in which a capacitance is produced by the second sub-pixel electrode PB2. Therefore, the transmittance per pixel can be enhanced.

Besides, the pixel electrode PE is formed of the same wiring material as the source line S, or a metallic material such as aluminum (Al), titanium (Ti), silver (Ag), molybdenum (Mo), tungsten (W), copper (Cu) or Chromium (Cr), or an alloy including any one of these metallic materials. Thus, the pixel electrode PE can be formed in the same fabrication step as the source line S, and the manufacturing cost can be reduced. In addition, compared to the case in which the pixel electrode PE is formed of ITO or IZO, the amount of use of indium (In) can be reduced. Moreover, an indium-free structure can be realized in the case where both the pixel electrode PE and the common electrode CE are formed of the above-described wiring material. Furthermore, since the liquid crystal molecules LM scarcely move from the initial alignment direction in the region above the pixel electrode PE at the ON time, as well as at the OFF time, little backlight passes through this region, and this region hardly contributes to display. Specifically, even if the pixel electrode PE is formed of an opaque wiring material, as in the present embodiment, there is little decrease in transmittance at the ON time or little decrease in area of the transmissive region, compared to the case where the pixel electrode PE is formed of the transparent, electrically conductive material.

The third insulation film 13 lies between the pixel electrode PE and first common electrode CE1 which are provided on the array substrate AR. It is thus possible to suppress short-circuit between the pixel electrode PE and common electrode CE.

In addition, the third insulation film 13 is formed of a resin material with a thickness of 1 μm or less, while maintaining the planarity of the surface thereof. Specifically, the first sub-pixel electrode PB1 and first sub-common electrode CBU1 can be disposed to be opposed to each other with a small distance therebetween, and a greater capacitance can be produced. Moreover, the pixel electrode PE can be located close to the liquid crystal layer LQ, and an electric field enough to drive the liquid crystal molecules LM can be produced with low power consumption between the pixel electrode PE and common electrode CE. Besides, in the aperture portion AP, the surface of the array substrate AR can be smoothed, and a disturbance in alignment of liquid crystal molecules LM due to asperities on the surface can be suppressed.

Since the first sub-common electrode CB1 is opposed to the gate line G, an undesired electric field from the gate line G can be shielded. In short, the first sub-common electrode CB1 functions as a gate shield electrode. It is thus possible to suppress application of an undesired bias from the gate line G to the liquid crystal layer LQ, and to suppress the occurrence of a display defect such as burn-in, and the occurrence of light leakage due to an alignment defect of liquid crystal molecules. In addition, since the first main common electrode CA1 is opposed to the source line S, an undesired electric field from the source line S can be shielded. In short, the first main common electrode CA1 functions as a source shield electrode. It is thus possible to suppress application of an undesired bias from the source line S to the liquid crystal layer LQ, and to suppress the occurrence of a display defect.

The first main common electrode CA1 and first sub-common electrode CB1 are electrically connected to each other and are formed in a grid shape. In addition, the second main common electrode CA2 and second sub-common electrode CB2, which are provided on the counter-substrate CT, are electrically connected to each other and are formed in a grid shape. Thus, even if breakage occurs in a part of the first common electrode CE1 provided on the array substrate AR or a part of the second common electrode CE2 provided on the counter-substrate CT, the common potential can stably be supplied to each pixel PX, and the occurrence of a display defect can be suppressed.

Next, another structure example of the present embodiment is described.

Figure 6:
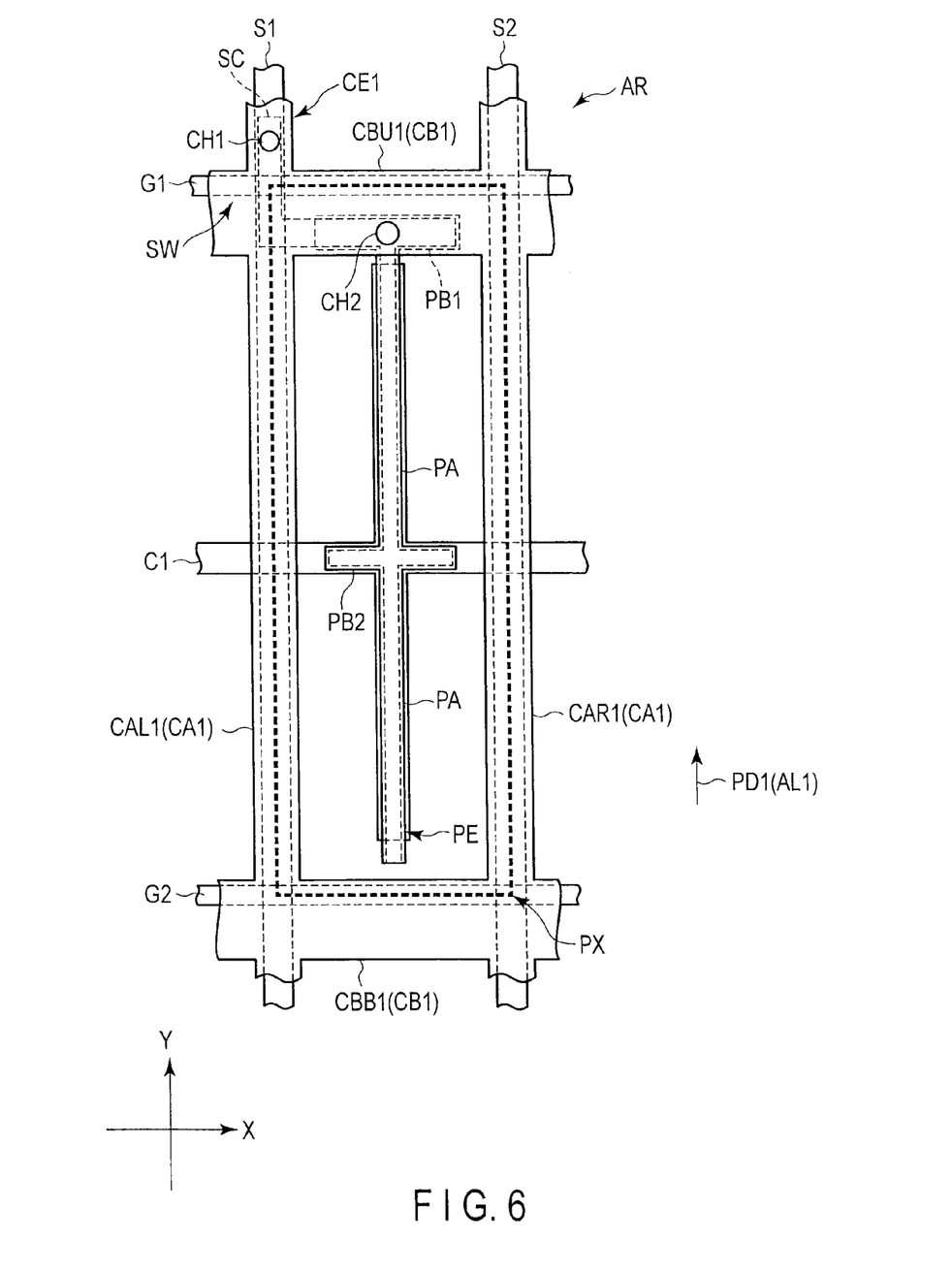
FIG. 6 is a plan view which schematically shows another structure example of one pixel at a time when the array substrate shown in FIG. 1 is viewed from the counter-substrate side.

FIG. 6 is a plan view which schematically shows another structure example of one pixel PX at a time when the array substrate AR shown in FIG. 1 is viewed from the counter-substrate side.

The structure example illustrated in FIG. 6 differs from the structure example illustrated in FIG. 2 in that the array substrate AR includes a storage capacitance line C1 which is opposed to the second sub-pixel electrode PB2, and that the array substrate AR includes a semiconductor layer SC which is opposed to the storage capacitance line C1.

The semiconductor layer SC is, for example, a semiconductor layer formed of polysilicon. The semiconductor layer SC extends in the second direction Y under the source line S1, and is electrically connected to the source line S1 via a contact hole CH1. In addition, the semiconductor layer SC extends under the gate line G1 from the position of the contact hole CH1, and extends in the first direction X to a position under the first sub-pixel electrode PB1, and is electrically connected to the first sub-pixel electrode PB1 via a contact hole CH2. In the meantime, in the example illustrated, the semiconductor layer SC further extends under the main pixel electrode PA and second sub-pixel electrode PB2.

The gate line G1 extends above the semiconductor layer SC in the first direction X. That region of the gate line G1, which is located above the semiconductor layer SC, functions as the gate electrode of the switching element SW. In addition, that region of the source line S1, which is connected to the semiconductor layer SC, functions as the source electrode of the switching element SW. That region of the first sub-pixel electrode PB1, which is connected to the semiconductor layer SC, functions also as the drain electrode of the switching element SW.

The storage capacitance line C1 is spaced apart from the gate line G1 and gate line G2, and is located between the gate line G1 and gate line G2. A part of the storage capacitance line C1 is opposed to the semiconductor layer SC and pixel electrode PE. In the example illustrated, a part of the storage capacitance line C1 is opposed to the main pixel electrode PA and second sub-pixel electrode PB2.

The array substrate AR having this structure can be combined with the counter-substrate CT shown in FIG. 3.

Figure 7:
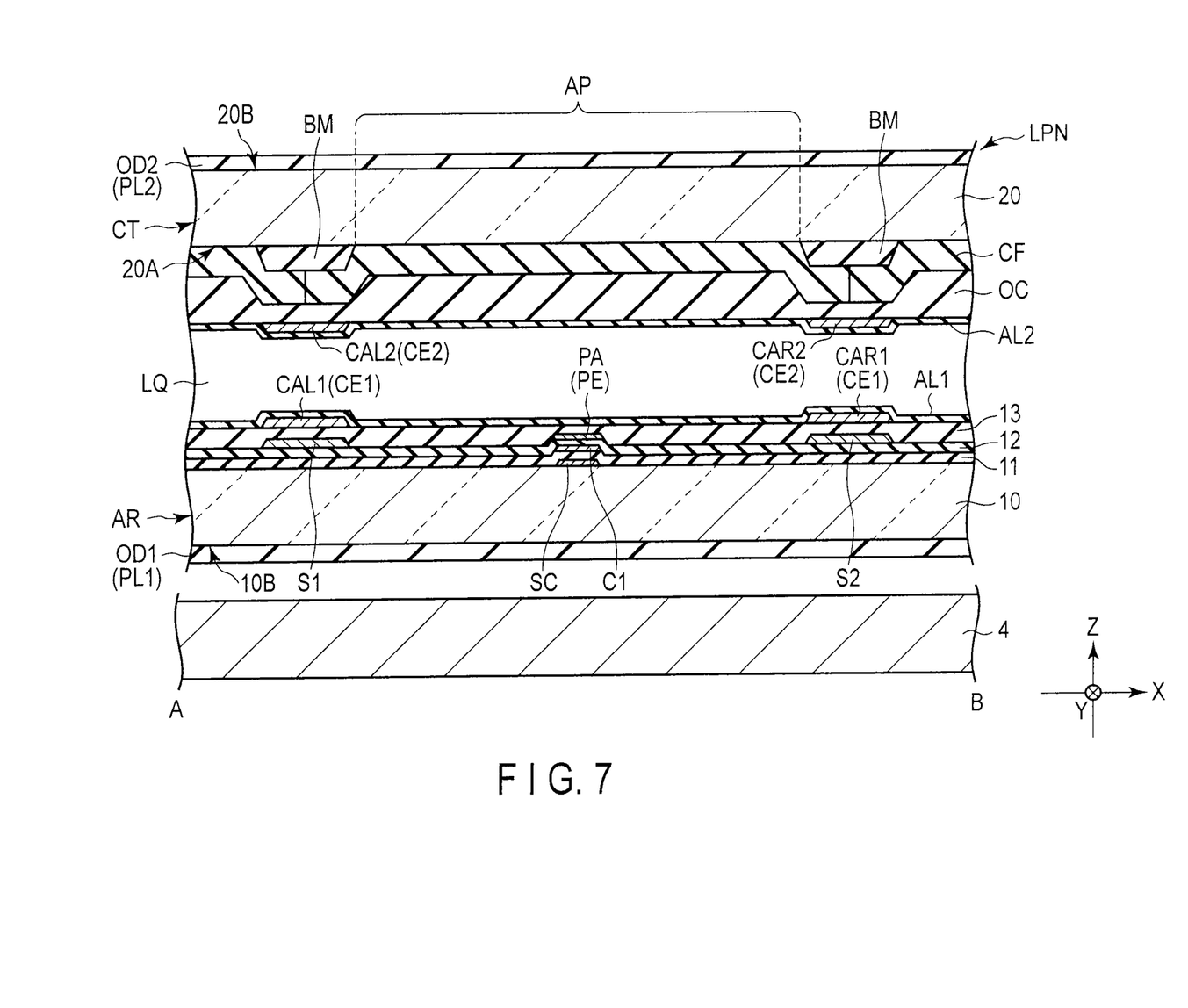
FIG. 7 is a schematic cross-sectional view, taken along line A-B in FIG. 3, showing a cross-sectional structure of a liquid crystal display panel to which the array substrate shown in FIG. 6 is applied.
Figure 8:
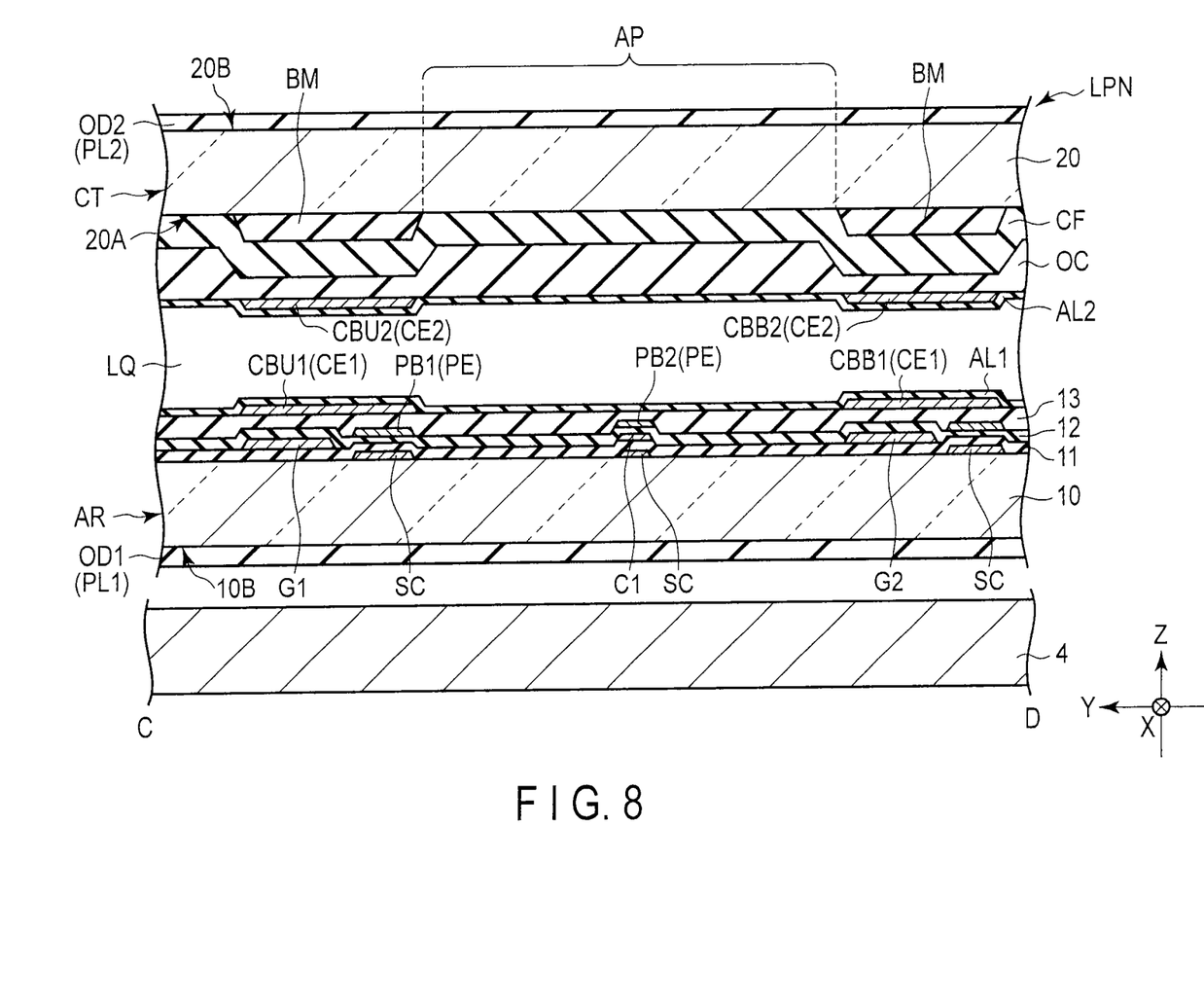
FIG. 8 is a schematic cross-sectional view, taken along line C-D in FIG. 3, showing a cross-sectional structure of the liquid crystal display panel to which the array substrate shown in FIG. 6 is applied.

FIG. 7 is a schematic cross-sectional view, taken along line A-B in FIG. 3, showing a cross-sectional structure of a liquid crystal display panel LPN to which the array substrate AR shown in FIG. 6 is applied. FIG. 8 is a schematic cross-sectional view, taken along line C-D in FIG. 3, showing a cross-sectional structure of the liquid crystal display panel LPN to which the array substrate shown AR in FIG. 6 is applied.

The array substrate AR includes, on the side facing the counter-substrate CT, a semiconductor layer SC, a gate line G1, a gate line G2, a storage capacitance line C1, a source line S1, a source line S2, a pixel electrode PE, a first common electrode CE1, a first insulation film 11, a second insulation film (first interlayer insulation film) 12, a third insulation film (second interlayer insulation film) 13, and a first alignment film AL1.

The semiconductor layer SC is formed on the first insulative substrate 10 and is covered with the first insulation film 11. In the example shown in FIG. 7, the semiconductor layer SC is located below the main pixel electrode PA. In the example shown in FIG. 8, the semiconductor layer SC is located below the first sub-pixel electrode PB1 and second sub-pixel electrode PB2.

The storage capacitance line C1, gate line G1 and gate line G2 are formed on the first insulation film 11, and are covered with the second insulation film 12. In the example shown in FIG. 7, the storage capacitance line C1 is located above the semiconductor layer SC and is located below the main pixel electrode PA. In the example shown in FIG. 8, the storage capacitance line C1 is located above the semiconductor layer SC and is located below the second sub-pixel electrode PB2.

In this structure example, a capacitance can be produced not only between the first sub-pixel electrode PB1 and first sub-common electrode CBU1, but also between the second sub-pixel electrode PB2 and storage capacitance line C1. In addition, in the example illustrated, a capacitance can also be produced between the first sub-pixel electrode PB1 and semiconductor layer SC, between the storage capacitance line C1 and semiconductor layer SC, and between the main pixel electrode PA and storage capacitance line C1.

In addition, at the first sub-pixel electrode PB1, the pixel electrode PE and switching element SW are electrically connected. Thus, compared to the case in which the second sub-pixel electrode PB2 is electrically connected to the switching element SW via a contact hole, the width in the second direction Y of the second sub-pixel electrode PB2 can be decreased. In addition, since a capacitance is produced not only between the storage capacitance line C1 and pixel electrode PE but also between the storage capacitance line C1 and semiconductor layer SC, the width of the second sub-pixel electrode PB2 can be decreased, compared to the case in which a capacitance is produced by mainly using the second sub-pixel electrode PB2. In this manner, since there is no need to increase the width of the second sub-pixel electrode PB2, a loss of the transmissive region is small. Therefore, a decrease in transmittance per pixel can be suppressed.

Needless to say, in this structure example, too, the same advantageous effects as in the structure example described with reference to FIG. 2 to FIG. 5 can be obtained.

As has been described above, according to the present embodiment, a liquid crystal display device, which can suppress degradation in display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first wiring line extending in a first direction, a first interlayer insulation film covering the first wiring line, a second wiring line located on the first interlayer insulation film and extending in a second direction crossing the first direction, a switching element electrically connected to the first wiring line and the second wiring line, a pixel electrode which is located on the first interlayer insulation film, is spaced apart from the second wiring line, is electrically connected to the switching element and includes a main pixel electrode extending in the second direction and a first sub-pixel electrode extending in the first direction along the first wiring line, a second interlayer insulation film covering the second wiring line and the pixel electrode, a first common electrode which is located on the second interlayer insulation film and includes a first main common electrode extending in the second direction and opposed to the second wiring line, and a first sub-common electrode extending in the first direction and located directly above the first wiring line and the first sub-pixel electrode, and a first alignment film covering the first common electrode;
a second substrate including a second alignment film; and
a liquid crystal layer held between the first substrate and the second substrate.

2. The liquid crystal display device of claim 1, wherein the pixel electrode is formed of a same material as the second wiring line.

3. The liquid crystal display device of claim 1, wherein the pixel electrode further includes a second sub-pixel electrode extending in the first direction and spaced apart from the first sub-pixel electrode.

4. The liquid crystal display device of claim 3, wherein the first sub-pixel electrode is located on one end side of the main pixel electrode, and the second sub-pixel electrode crosses a substantially middle portion of the main pixel electrode.

5. The liquid crystal display device of claim 3, wherein the first substrate further includes a storage capacitance line opposed to the second sub-pixel electrode.

6. The liquid crystal display device of claim 5, wherein the switching element includes a semiconductor layer opposed to a part of the storage capacitance line.

7. The liquid crystal display device of claim 1, wherein the second interlayer insulation film is formed of a resin material with a thickness of 1 µm or less.

8. The liquid crystal display device of claim 6, wherein the semiconductor layer extends under the main pixel electrode.

9. The liquid crystal display device of claim 8, wherein the semiconductor layer extends under the second sub-pixel electrode.

10. The liquid crystal display device of claim 5, wherein the storage capacitance line is opposed to the main pixel electrode.

* * * * *